(12) United States Patent
Li et al.

(10) Patent No.: US 12,429,309 B1
(45) Date of Patent: Sep. 30, 2025

(54) DOWN-HANGING LAMP

(71) Applicant: Syswit Optoelectronics Technology Co., Ltd., Guangdong (CN)

(72) Inventors: Wenjie Li, Guangdong (CN); Xi Wang, Guangdong (CN); Zhenkai Zhou, Guangdong (CN)

(73) Assignee: Syswit Optoelectronics Technology Co., Ltd., Guangzhou (CN)

( * ) Notice: Subject to any disclaimer, the term of this patent is extended or adjusted under 35 U.S.C. 154(b) by 0 days.

(21) Appl. No.: 18/661,832

(22) Filed: May 13, 2024

(30) Foreign Application Priority Data

Mar. 27, 2024 (CN) .......................... 202410362598.2

(51) Int. Cl.
  *F41G 11/00* (2006.01)
  *F41G 1/35* (2006.01)
  *H02J 7/00* (2006.01)

(52) U.S. Cl.
  CPC .............. *F41G 11/003* (2013.01); *F41G 1/35* (2013.01); *H02J 7/0042* (2013.01)

(58) Field of Classification Search
  CPC ......... F41G 11/003; F41G 1/35; H02J 7/0042
  See application file for complete search history.

(56) References Cited

U.S. PATENT DOCUMENTS

| | | | |
|---|---|---|---|
| 8,904,698 B2 * | 12/2014 | Riley | F41G 1/35 362/113 |
| 9,841,258 B1 * | 12/2017 | Galli | F41G 11/003 |
| 10,030,939 B2 * | 7/2018 | Kowalczyk, Jr. | F41G 11/003 |
| 10,323,903 B2 * | 6/2019 | Hedeen | F41C 33/0254 |
| 10,697,623 B2 * | 6/2020 | Worman | F21V 19/0035 |
| 12,123,581 B2 * | 10/2024 | Sharrah | F21V 23/04 |
| 12,123,683 B2 * | 10/2024 | Teetzel | F41G 11/00 |
| 12,163,761 B2 * | 12/2024 | Reed | F21V 21/088 |
| 12,241,722 B2 * | 3/2025 | Sun | F41G 11/003 |
| 2020/0200508 A1 * | 6/2020 | Teetzel | F41G 1/36 |
| 2022/0003393 A1 * | 1/2022 | Starr | F21V 23/04 |
| 2025/0180329 A1 * | 6/2025 | Sun | F41G 11/003 |

FOREIGN PATENT DOCUMENTS

CN 218917788 U 4/2023

* cited by examiner

*Primary Examiner* — Michelle Clement
(74) *Attorney, Agent, or Firm* — Rondaus PLLC; George Liu

(57) ABSTRACT

The present disclosure relates to a down-hanging lamp used for mounting on a guide rail of a firearm, the guide rail is provided with a transverse groove, comprising: a mounting base, a movable clamping block and a clamping block; the front of the mounting base is provided with a spotlight, the down-hanging lamp further comprises a battery; a battery mounting groove is formed on the mounting base; the battery is detachably installed in the battery mounting groove and is electrically connected with the mounting base, it further comprising a magnetic charging cable used for charging the battery, wherein the magnetic charging cable is provided with a second elastic needle matched with the contact, the magnetic charging cable is connected with the battery through magnetic attraction. The battery pack can be disassembled from the mounting base, making it convenient to replace the battery pack during use without disassembling the lamp.

9 Claims, 21 Drawing Sheets

DOWN-HANGING LAMP

TECHNICAL FIELD

The present disclosure herein relates to the technical field of firearm accessories, in particular to a down-hanging lamp thereof.

BACKGROUND

The existing gun lamp battery replacement methods generally adopt the following three methods: the first method is to preset a rechargeable battery (the battery is not detachable) inside the gun lamp main body, and use a magnetic attraction or plugging method to supplement the battery with electricity; the second method is to open the gun lamp main body from the firearm and replace the new battery; and the third method is to remove the gun lamp from the firearm as a whole, and then replace the battery.

All three of these methods are inconvenient to use. The first method requires charging the gun lamp and the firearm as a whole, resulting in a longer charging time, or connecting a mobile charging device to the gun lamp or the firearm as a whole, resulting in inconvenient use, due to a longer charging time, inevitably causing a storage blind area in the process of charging the firearm, and charging is more troublesome when used in the field. The second method, due to the disassembly and assembly structure of the battery, there is a certain gap between the battery and the gun lamp, when disassembling and assembling the battery, it is necessary to ensure that the surrounding environment is dry and dust-free, and rainwater, sand, and dust, etc. cannot enter the interior of the gun lamp, otherwise it is easy to cause short circuit or unable to boot. The third method, after each replacement of the battery, you need to reinstall, adjust the position of the gun lamp.

SUMMARY

The technical problem to be solved by the present disclosure is to provide a down-hanging lamp aiming at the above defects.

To solve the above technical problems, the present disclosure adopts the following technical scheme:
  a down-hanging lamp used for mounting on a guide rail of a firearm, wherein the guide rail is provided with a transverse groove, wherein the down-hanging lamp main body comprising: a mounting base, a movable clamping block and a clamping block;
  the front of the mounting base is provided with a spotlight;
  one side of the upper part of the mounting base is provided with a fixed clamping block formed by extending upwards, the opposite side of the mounting base is detachable provided with the movable clamping block, and the fixed clamping block and the movable clamping block are used for being oppositely clamped on both sides of the guide rail;
  the upper part of the mounting base is provided with a limit clamping strip arranged along the direction of the guide rail in an embedded manner;
  the clamping block is provided at the upper part of the mounting base and only has the freedom of sliding along the direction of the guide rail; the upper part of the clamping block is provided with a bulge which is used for being embedded with the transverse groove, and the lower part of the clamping block is engaged with the limit clamping strip;
  one side of the mounting base is inserted and provided with an adjusting button which is used for controlling the limit clamping strip to engage or disengage with the clamping block;
  the down-hanging lamp further comprises a battery;
  a battery mounting groove is formed on the mounting base;
  the battery is detachably installed in the battery mounting groove and is electrically connected with the mounting base;
  the mounting base is provided with a battery buckle, the upper part of the battery buckle is exposed to the surface of the mounting base, and the lower part of the battery buckle protrudes from the surface of the battery mounting groove;
  the mounting base is internally provided with a buckle spring, and the buckle spring pushes the battery buckle towards the direction that the battery buckle protrudes from the surface of the battery mounting groove;
  the surface of the battery is provided with a buckling groove, and when the battery is installed in the battery mounting groove, the lower part of the battery buckle is embedded with the buckling groove;
  the surface of the battery is provided with a conductive contact point, the battery mounting groove is internally provided with an elastic needle plate, the elastic needle plate is top pressed and fixed in the battery mounting groove through an elastic needle pressing plate, and a blocking pad with waterproof performance is lined between the elastic needle pressing plate and the elastic needle plate;
  when the battery is installed in the battery mounting groove, a first elastic needle on the elastic needle plate is kept in contact with the contact point;
  one side of the mounting base is inserted and provided with a fastening shaft, the end part of the insertion end of the fastening shaft is provided with an axial threaded hole, and the insertion end of the fastening shaft is clamped with a first washer for limiting the pulling out thereof;
  one side of the movable clamping block facing away from the mounting base is embedded and provided with an anti-drop bolt, and the anti-drop bolt is used for threaded connection of the fastening shaft;
  one side of the movable clamping block facing away from the mounting is embedded and provided with a locking element, one side of the locking element facing away from the mounting base is embedded and provided with the anti-drop bolt, and an anti-drop spring is lined between the locking element and the movable clamping block;
  the position of the fastening shaft close to the outer end part is provided with a ring of tooth grooves, the front end opening of the mounting base is provided with an elastic thimble, and the mounting direction of the elastic thimble is orthogonal to the mounting direction of the fastening shaft;
  the tip of the elastic thimble is pushed inwards into the tooth groove of the fastening shaft; and
  the elastic thimble is provided with threads, and the distance between the outer end surface of the elastic thimble and the fastening shaft is adjustable.
  the end part of the insertion end of the adjusting button is clamped with a second washer for limiting the pulling out thereof;

an adjusting spring is lined between the adjusting button and the mounting base;

the limit clamping strip is provided with an adjusting groove, and the end part of the insertion end of the adjusting button hooks the adjusting groove;

the limit clamping strip is provided with a row of limiting teeth arranged along the direction of the guide rail, the bottom of the clamping block is provided with a matching teeth, and the matching teeth is meshed with the limiting teeth;

a cushion block is lined between the clamping block and the limit clamping strip;

the bulge of the clamping block is provided with an expansion groove, the expansion groove is used for fitting and installing a compensation piece, and the compensation piece is fitted with the bulge and used for embedding the transverse groove with different widths; and further comprising a magnetic charging cable used for charging the battery, wherein the magnetic charging cable is provided with a second elastic needle matched with the contact point, and the magnetic charging cable is connected with the battery through magnetic attraction.

Further, the battery comprises a battery core, a battery pack housing and a control board, wherein the battery core is provided in the battery pack housing, the battery pack housing is provided with a convex portion, the battery mounting groove is provided with a concave portion, the concave portion is matched with the convex portion;

the control board is positioned in the convex portion, the control board is provided with a plurality of contact points, the contact point penetrates through the surface of the convex portion, the convex portion is provided with two first magnets, the magnetic pole directions of the two first magnets are opposite, and the contact point and the battery core are electrically connected with the control board; and the magnetic charging cable is provided with two second magnets, the magnetic pole directions of the two second magnets are opposite, and after all the first magnets and all the second magnets attract each other, the second elastic needle is communicated with the contact point.

Further, the battery pack housing comprises a battery pack upper housing and a battery pack lower housing, the convex portion is provided on the battery pack upper housing, and the buckling groove is provided on the battery pack lower housing.

Further, both sides of the bottom of the battery pack lower housing are provided with brackets, both sides of the bottom of the battery mounting groove are provided with convex strips, and the convex strip is matched with the bracket.

Further, the battery pack upper housing is provided with a plurality of magnetic grooves, the magnetic groove is positioned inside the convex portion, and the first magnet is provided in the magnetic groove.

Further, the battery further comprises a light guide member, the control board is provided with a plurality of indicator lamps, the light incident surface of the light guide member is matched with all the indicator lamps, and the light emitting surface of the light guide member penetrates through the surface of the convex portion.

Further, the light guide member is provided with a plurality of grooves, the groove is used for dividing the light emitting surface, the convex portion is provided with a light shielding cotton, and the light shielding cotton is provided in the groove.

Further, the control board is provided with a detection switch, and the battery pack housing is provided with a detection button matched with the detection switch.

Further, a bracket is provided between the battery cell and the control board.

After adopting the technical scheme, compared with the prior art, the present disclosure has the following advantages:

the present disclosure uses a battery pack to provide power to the down-hanging lamp, the battery pack is connected to the lamp through a contact-elastic needle method, the battery pack is sealed and does not need to consider the usage environment, the battery pack can be disassembled from the mounting base, making it convenient to replace the battery pack during use without disassembling the lamp, and can quickly replace the lamp with a new battery pack; and after the down-hanging lamp is fixed on the firearm, the adjusting button can be pressed and the down-hanging lamp can be pushed to directly adjust the front and rear positions of the down-hanging lamp relative to the firearm, thereby improving the adjusting flexibility of the down-hanging lamp.

The present disclosure will be described in detail below with reference to the accompanying drawings and embodiments.

DETAILED DESCRIPTION OF THE EMBODIMENTS

Figure 1:
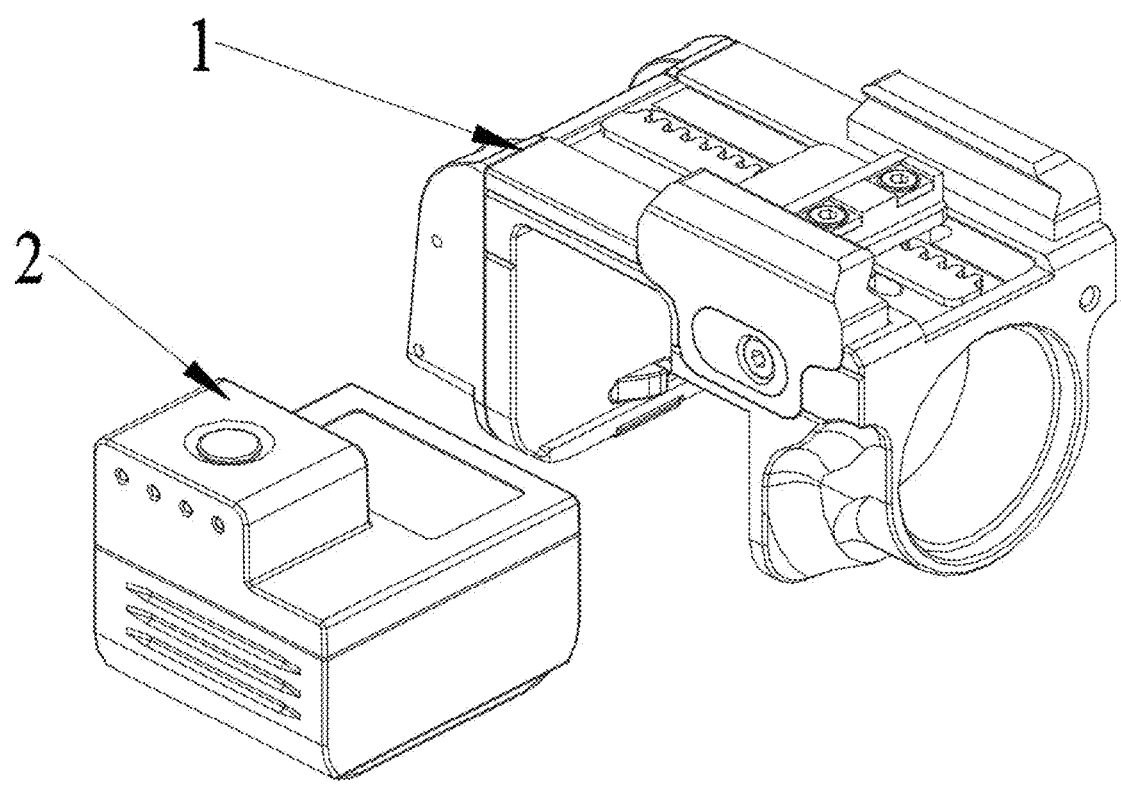
FIG. 1 is the overall schematic diagram of a down-hanging lamp.
Figure 2:
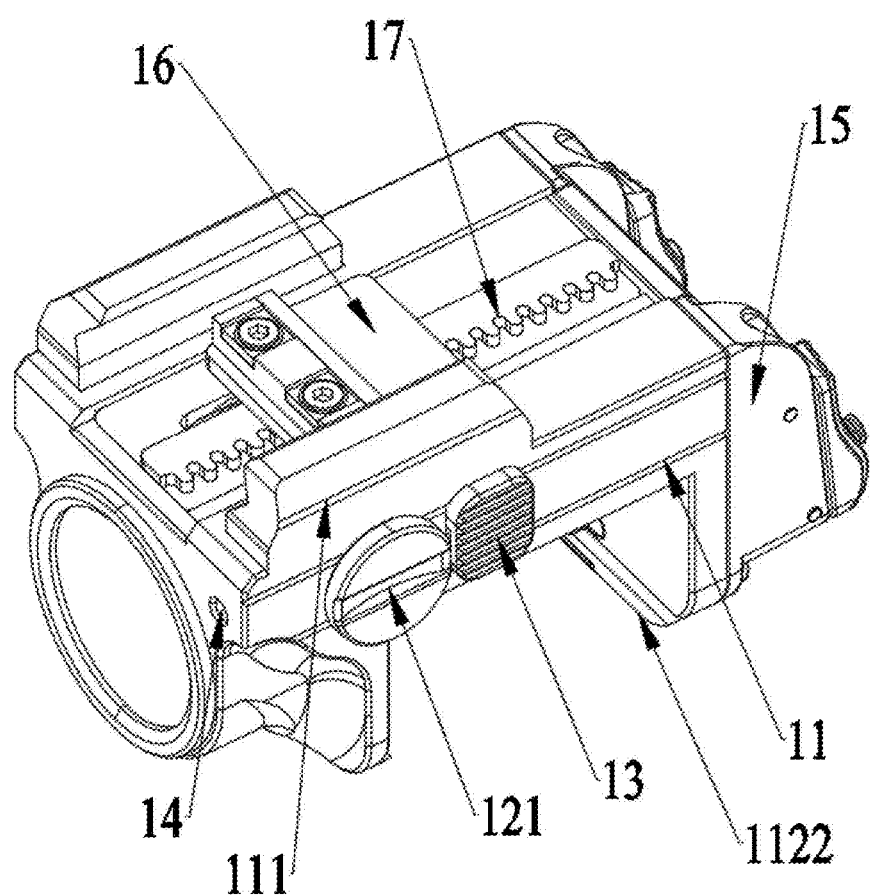
FIG. 2 is a perspective view of a down-hanging lamp main body.
Figure 3:
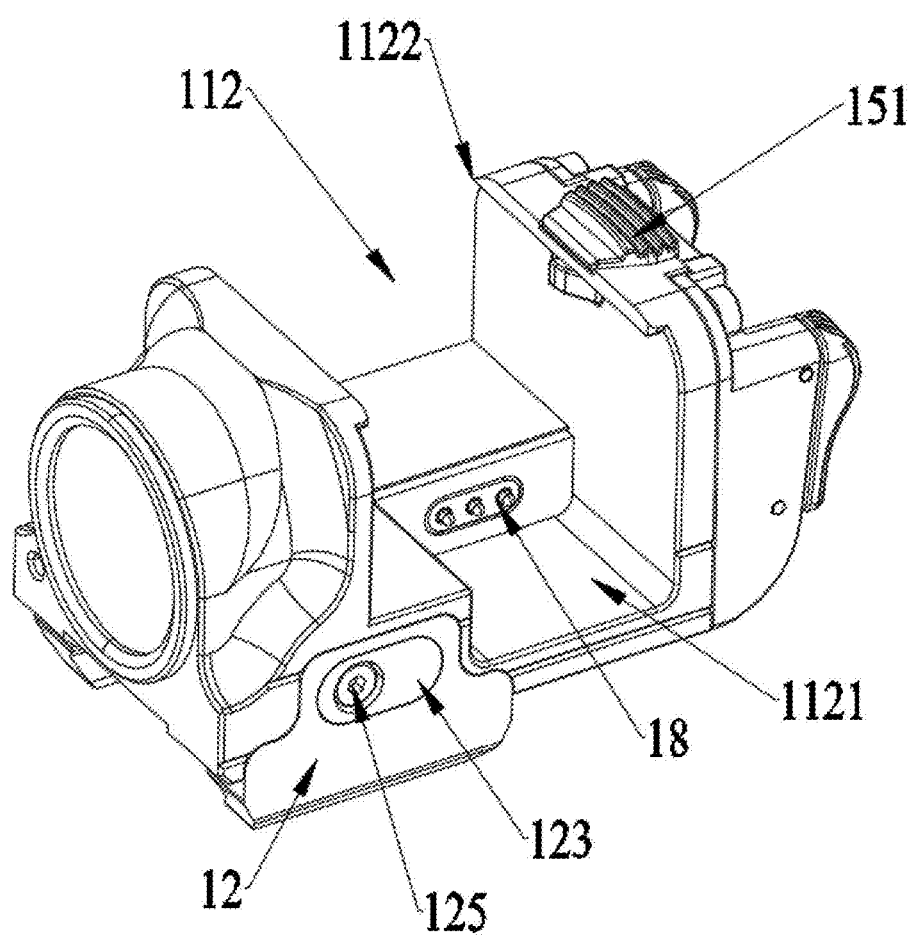
FIG. 3 is another perspective view of a down-hanging lamp main body.

The principles and features of the present disclosure are described below with reference to the accompanying drawings, examples of which are given only to explain the present disclosure and are not intended to limit the scope of the present disclosure.

In the description of the present disclosure, it should be noted that the orientation or positional relationship indicated by the terms "center," "upper," "lower," "left," "right," "vertical," "horizontal," "inner," "outer," "clockwise," and "counterclockwise" are based on the orientation or positional relationship shown in the drawings, and are only for convenience in describing the present disclosure and simplifying the description, rather than indicating or implying that the device or element referred to must have a particular orientation, be constructed and operate in a particular orientation, therefore, it should not be construed as a limitation of the present disclosure.

As shown in FIG. 1, a down-hanging lamp mainly comprises a down-hanging lamp main body 1 and a battery 2, wherein the battery 2 is detachably installed on the down-hanging lamp main body 1.

Further as shown in FIGS. 2, 3, 22, 23 and 24, the down-hanging lamp main body 1 mainly carries and installs various parts by a mounting base 11, the mounting base 11 is provided with a battery mounting groove 112; wherein the portions carried by the mounting base 11, the front of the mounting base 11 is provided with a spotlight 19, which provides an illumination function; one side of the upper part of the mounting base 11 is provided with a fixed clamping block 111 formed by extending upwards, the opposite side of the mounting base 11 is detachably provided with a movable clamping block 12, the down-hanging lamp main body 1 is mainly used to match firearms with the guide rail 3, especially Picatinny guide rail, and the fixed clamping block 111 and the movable clamping block 12 are used for being oppositely clamped on both sides of the guide rail 3, allowing the down-hanging lamp main body 1 to slide along the guide rail 3; the upper part of the mounting base 11 is also provided with a limit clamping strip 17 with teeth which is arranged along the front-rear direction and has a movable margin and can be close to or far away from the fixed clamping block 111; the clamping block 16 is arranged above the mounting base 11 and is positioned between the fixed clamping block 111 and the movable clamping block 12, which is confined by the structure of the top of the mounting base 11 (the top of the mounting base 11 is provided with a groove, and the edge of the lower part of the clamping block 16 is clamped in the groove, which is not shown in the FIG), can only slide back and forth, has a bulge at the upper part thereof, and is used for embedding in the transverse groove 31 of the Picatinny guide rail, and has teeth at the lower part thereof, and is used for engaging with the limit clamping strip 17; one side of the mounting base 11 close to the fixed clamping block 111 is penetrated with an adjusting button 13, one end of the adjusting button 13 is exposed outside the mounting base 11, and the other end of the adjusting button 13 penetrates through the mounting base 11 to hook a limit clamping strip 17, under normal circumstances, the limit clamping strip 17 engages with the clamping block 16, the clamping block 16 cannot move, by pressing the adjusting button 13, the limit clamping strip 17 is driven to disengage from the engagement state with the clamping block 16, and the clamping block 16 can slide back and forth; the mounting base 11 is further provided with a fastening shaft 121 which passes through the mounting base 11 and is connected with an anti-drop bolt 125 on the other side, the anti-drop bolt 125 buckles the locking element 123, the locking element 123 buckles the movable clamping block 12, thereby completing the mounting and fixing of the movable clamping block 12; the battery mounting groove of the mounting base 11 is provided with an elastic needle plate 18 for electrically connecting to the mounted battery 2; the mounting base 11 is further provided with a battery buckle 151, which is installed at a rear position on the mounting base 11 through a rear cover 15, and is used for clamping the battery 2 when the battery 2 is installed on the down-hanging lamp main body 1 to prevent the battery 2 from being loosened, and when the battery buckle 151 is pulled at the tail of the down-hanging lamp main body 1, the battery buckle 151 can release the restraint on the battery 2, whereby the battery 2 can be loosened and disassembled.

Figure 4:
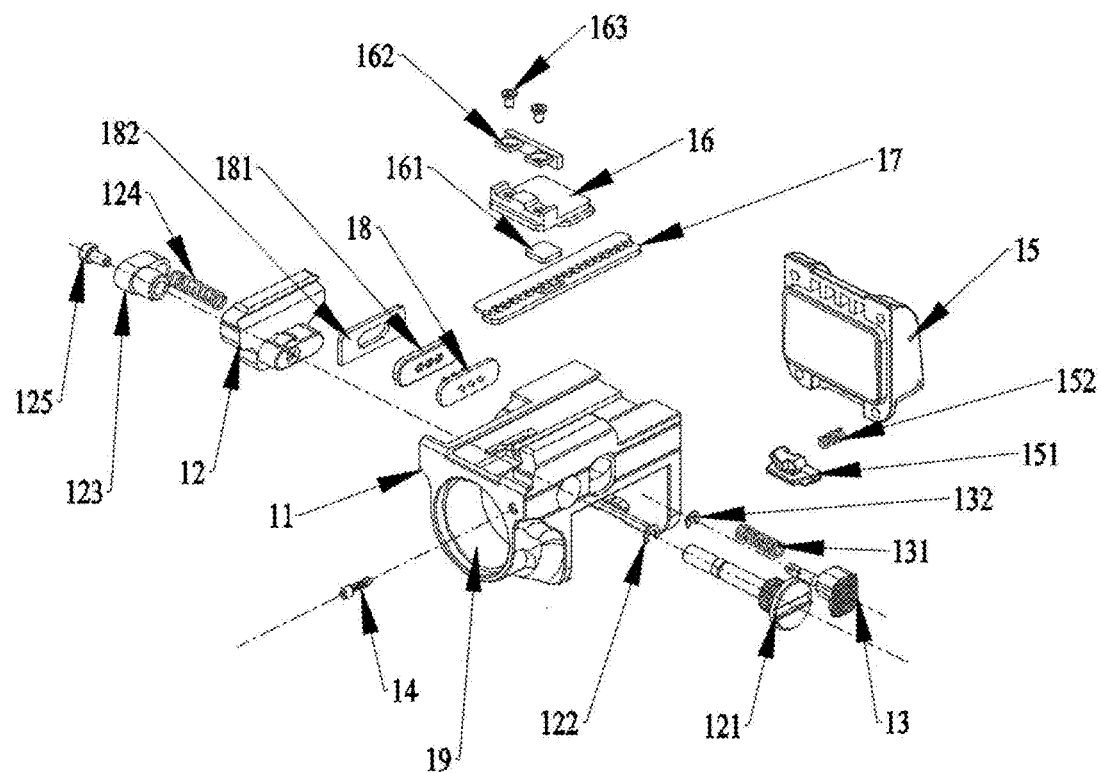
FIG. 4 is an exploded view of a down-hanging lamp main body.
Figure 5:
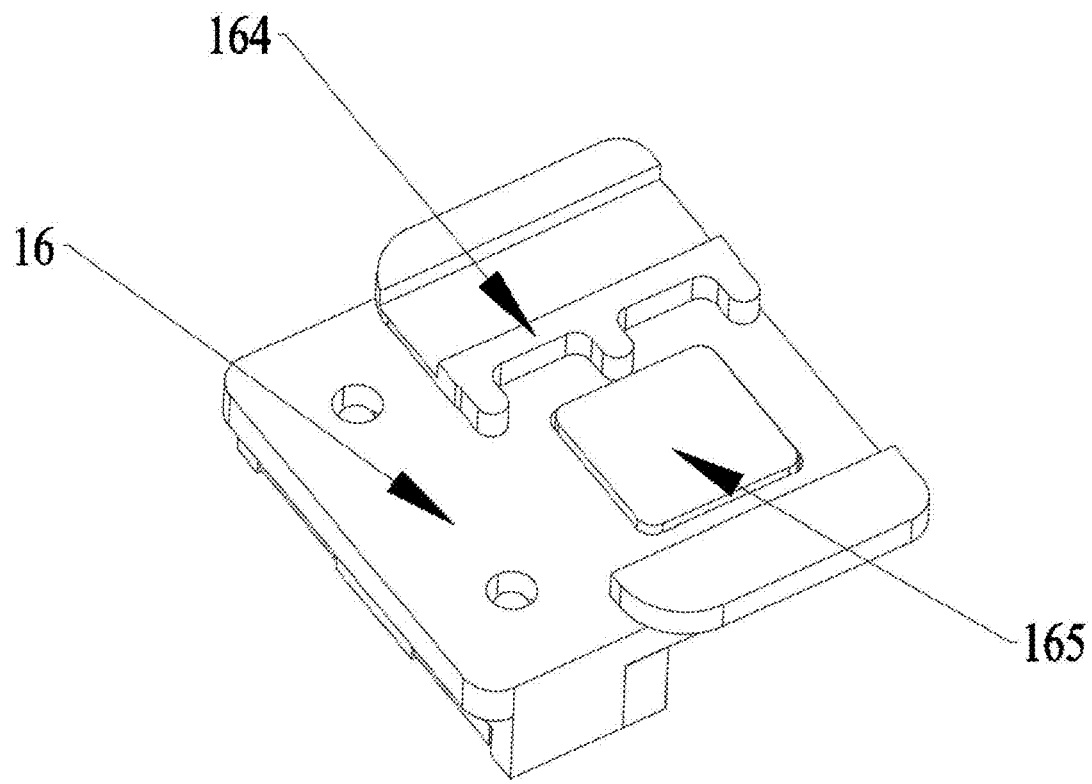
FIG. 5 is a perspective view of a clamping block.
Figure 6:
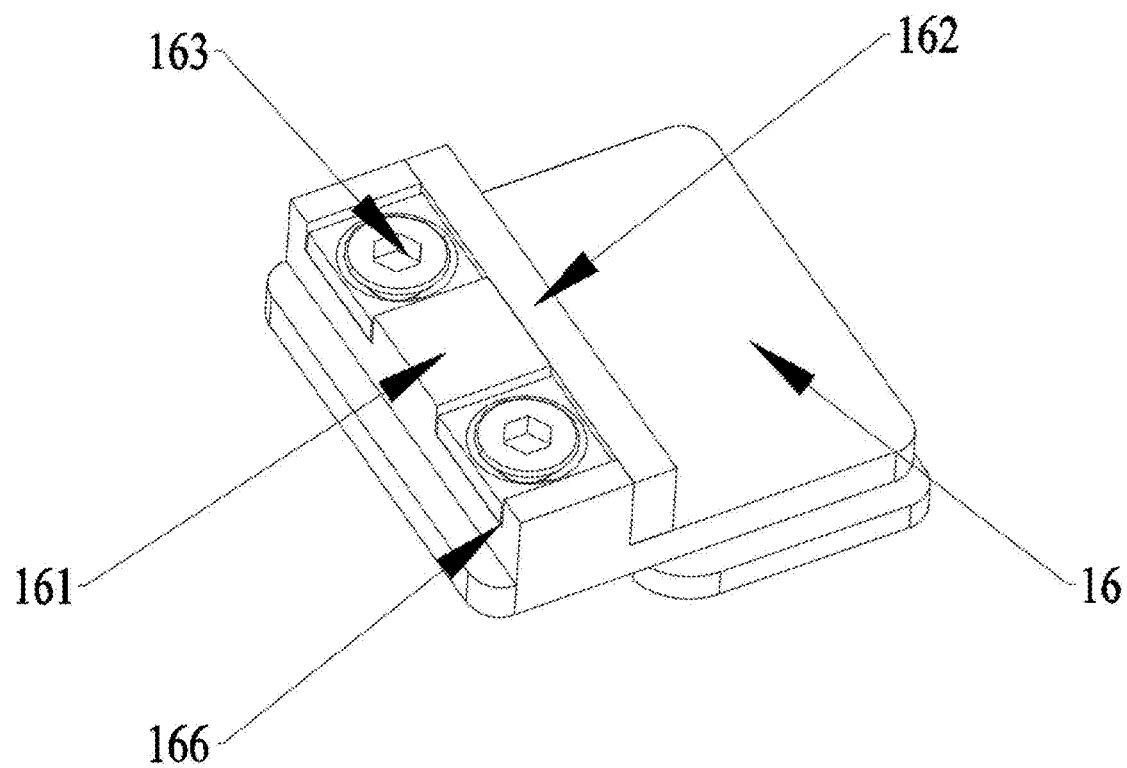
FIG. 6 is a perspective view of another angle of a clamping block.
Figure 7:
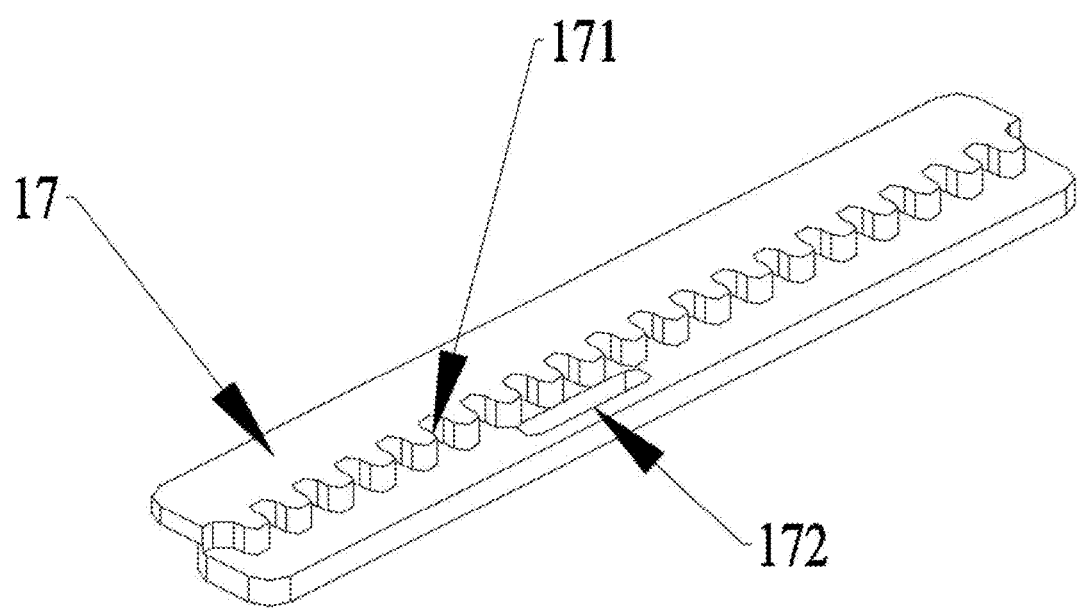
FIG. 7 is a perspective view of a limit clamping strip.
Figure 10:
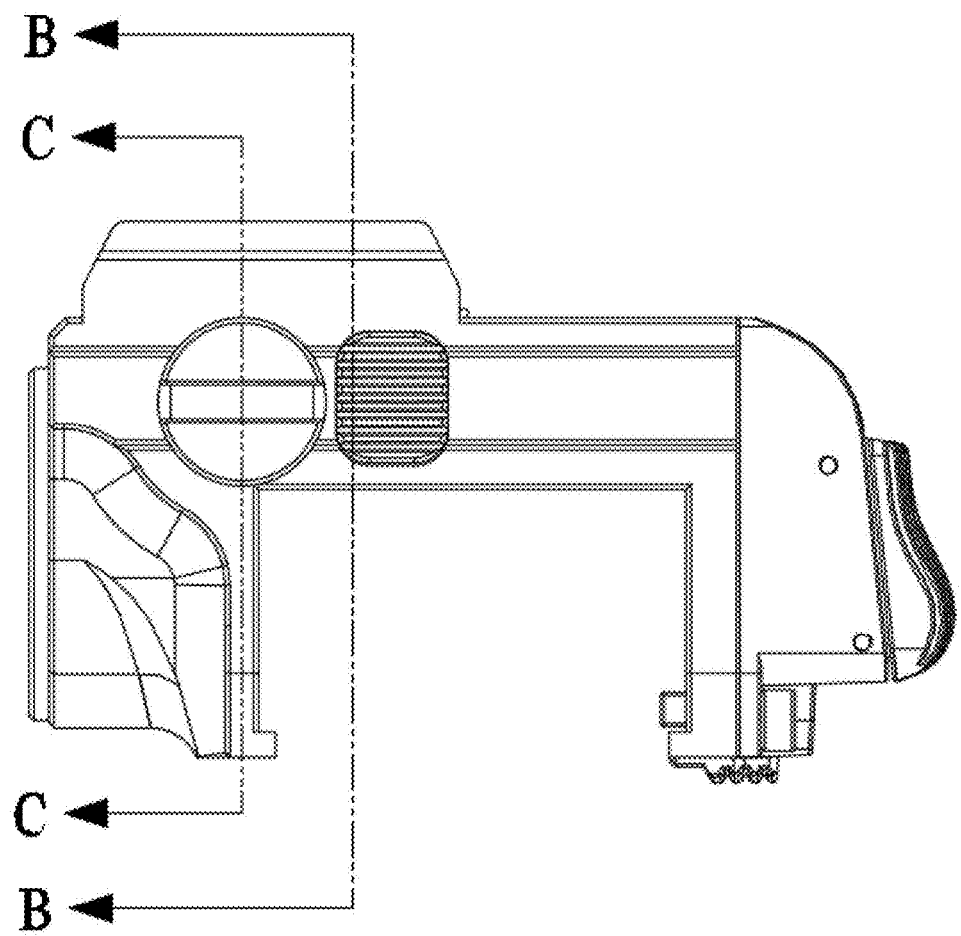
FIG. 10 is a front view of a down-hanging lamp main body.
Figure 13:
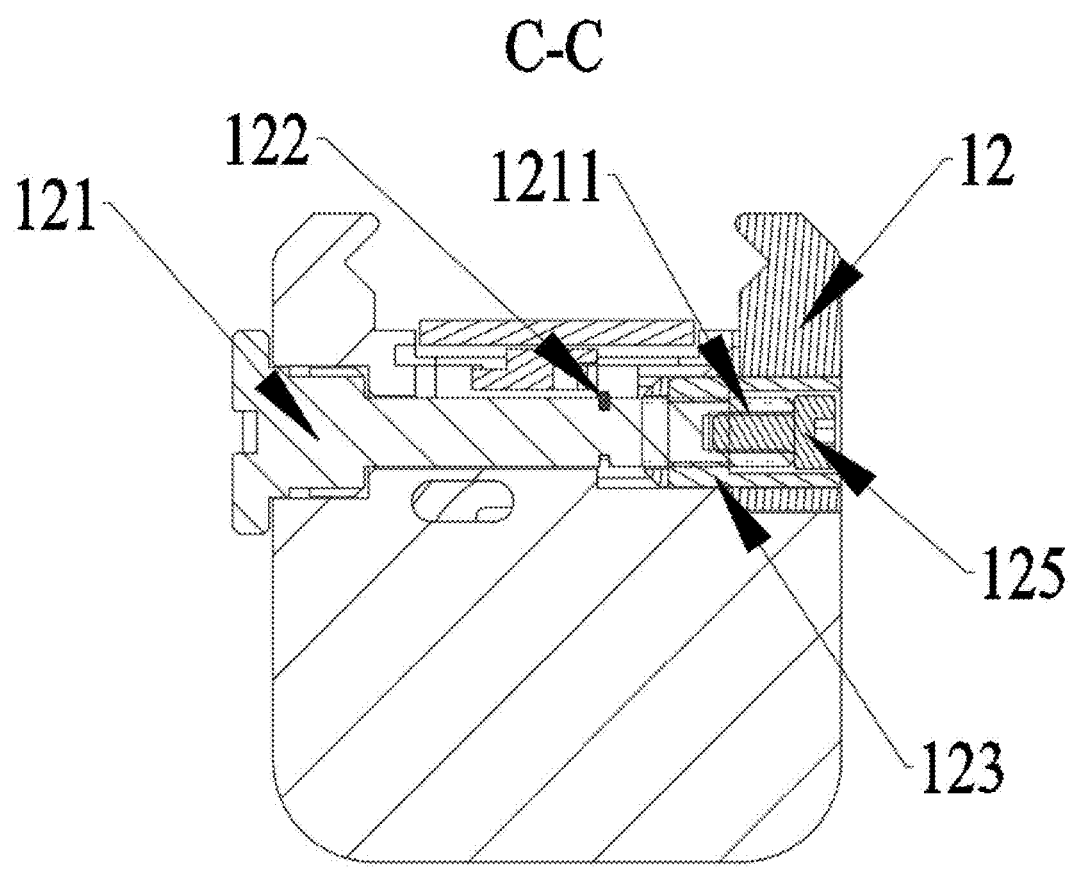
FIG. 13 is a C-C sectional view of FIG. 10.

The overall detailed structure of the down-hanging lamp is described in detail below:

referring to FIGS. 4, 10 and 13, the end part of the insertion end of the fastening shaft 121 is provided with an axial threaded hole 1211, and the anti-drop bolt 125 can be screwed into the threaded hole 1211; as described above, the end of the anti-drop bolt 125 is embedded in the locking element 123, and the locking element 123 is embedded in the movable clamping block 12, so that when the anti-drop bolt 125 is fixed and rotated (in a specific embodiment, the outer end of the anti-drop bolt is provided with an internal hexagonal opening, and a hexagonal wrench can be inserted to limit its rotation), the locking member 123 can be pushed out or tightened by rotating the fastening shaft 121, so as to adjust the clamping degree of the movable clamping block 12; the end of the fastening shaft 121 penetrating the mounting base 11 is provided with a first washer 122, preventing the fastening shaft 121 from being directly pulled out; an anti-drop spring 124 (which is in a compressed state) is lined between the locking member 123 and the movable clamping block 12, and is used for continuously supporting the movable clamping block 12 to prevent the movable clamping block 12 from being released when the locking member 123 is pushed out by rotating through the fastening shaft 121, meanwhile, the anti-drop spring 124 can prevent the down-hanging lamp main body 1 from directly dropping from the installed guide rail, and can manually toggle the movable clamping block 12 to remove the down-hanging lamp main body 1 under such circumstances.

Figure 8:
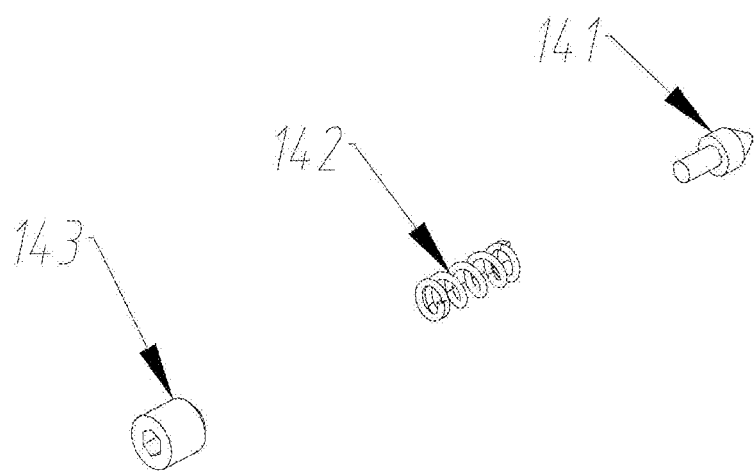
FIG. 8 is a schematic diagram of the composition of an elastic thimble.
Figure 9:
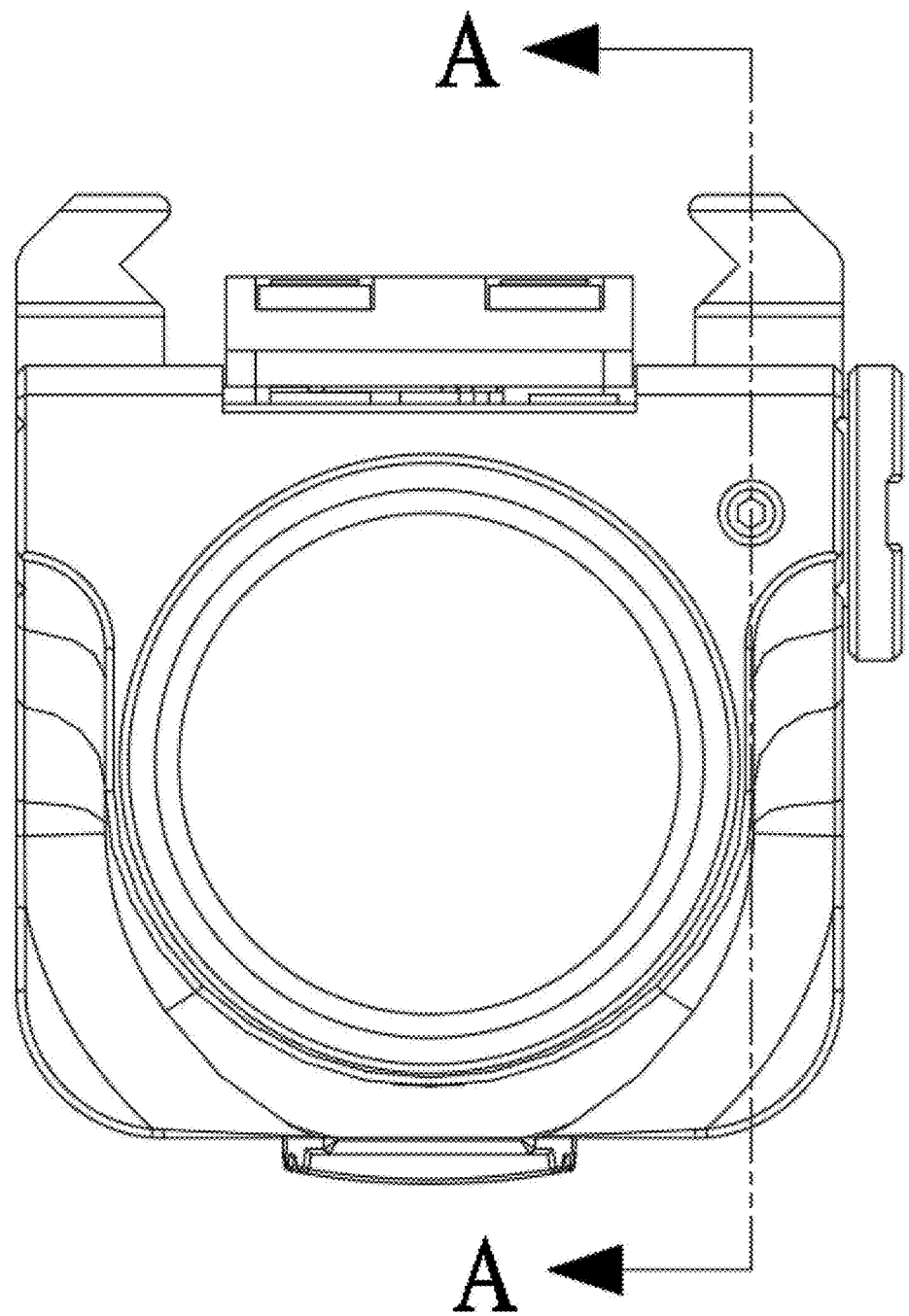
FIG. 9 is a left side view of a down-hanging lamp main body.
Figure 11:
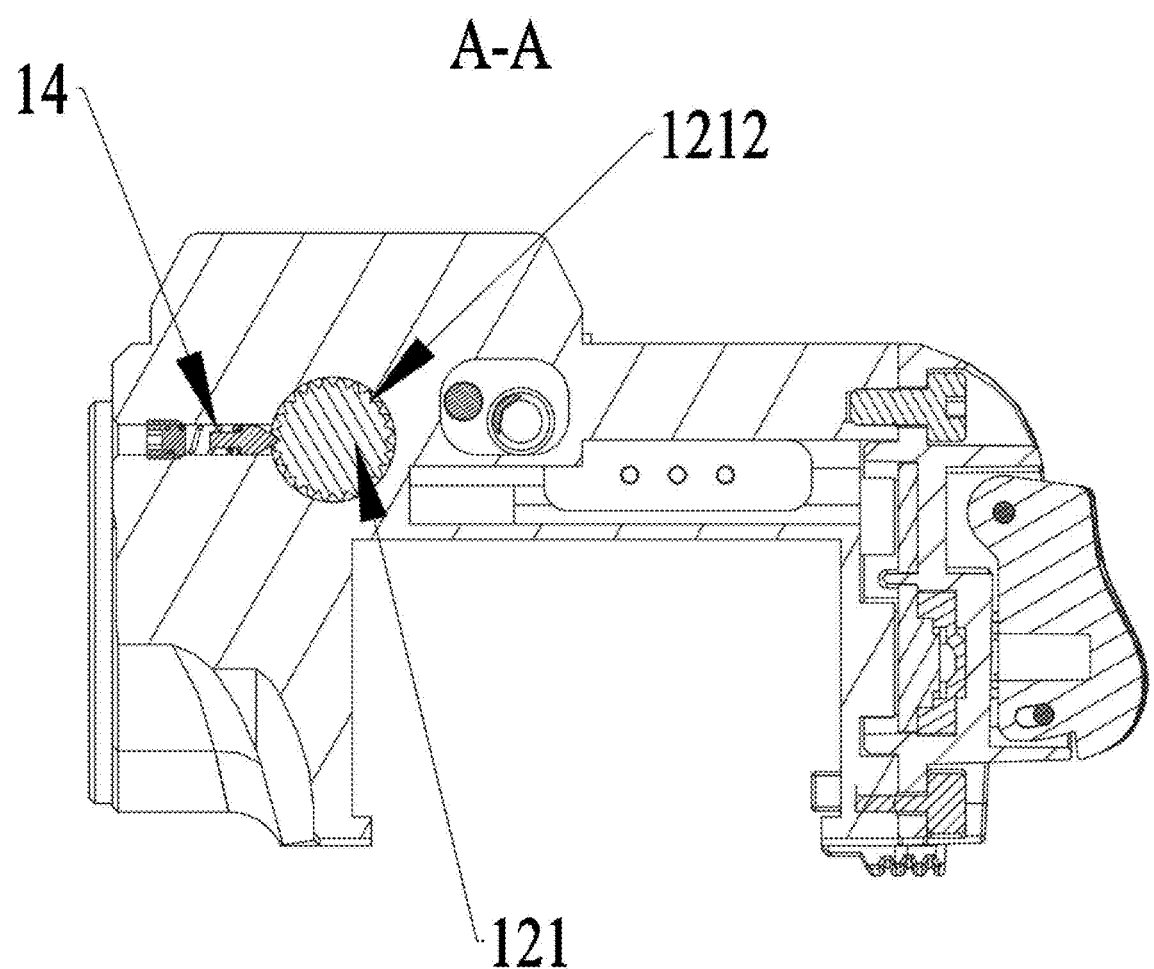
FIG. 11 is a A-A sectional view of FIG. 9.
Figure 12:
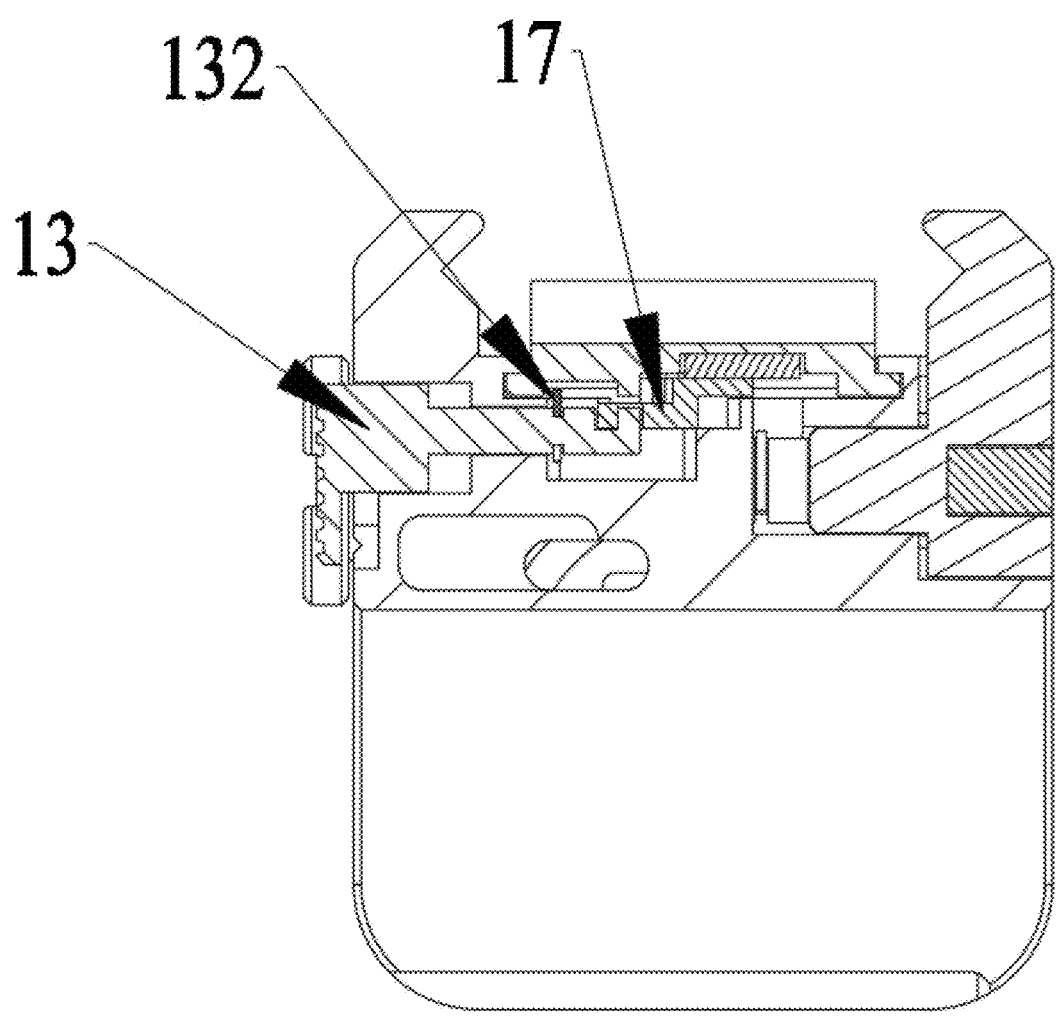
FIG. 12 is a B-B sectional view of FIG. 10.

Further referring to FIGS. 8, 9 and 11, the position of the fastening shaft 121 close to the outer end part is provided with a ring of tooth grooves 1212, the front end opening of the mounting seat 11 is provided with an elastic thimble 14, which consists of a needle tip 141, a needle spring 142 and a needle cap 143, wherein the mounting direction of the elastic thimble 14 is orthogonal to the mounting direction of the fastening shaft 121; the tip of the elastic thimble 14 is pushed inwards into the tooth groove 1212 of the fastening shaft 121, so that the fastening shaft 121 can be rotated and screwed, and is not easy to rotate and loosen spontaneously; in addition, the compression degree of the needle spring 142 can be changed by adjusting the position of the needle cap 143, thereby adjusting the tightening degree of the elastic thimble 14.

Referring to FIGS. 4, 7, 10 and 12, the adjusting button 13 is inserted into the mounting base 11, and a second washer 132 is clamped at the end of the insertion end thereof, so that the adjusting button 13 cannot be pulled out; an adjusting groove 172 is opened on the limit clamping strip 17, the end of the adjusting button 13 hooks into the adjusting groove 172, and an adjusting spring 131 (in a compressed state) is lined between the adjusting button 13 and the mounting base 11, so that the adjusting button 13 is pushed outward under normal conditions, and then the limit clamping strip 17 is tightened, and the limit clamping strip 17 can be pushed by pressing the adjusting button 13 inward.

After pressing the adjusting button 13, the adjusting button 13 pushes the limit clamping strip 17 to move to the side far away from the clamping block 16, so that the limiting teeth 171 and the matching teeth 164 are uncoupled, so that the clamping block 16 can be slid along the groove on the mounting base 11, so as to adjust the position of the clamping block 16 to adapt to the opening grooves of different gun types; after releasing the adjusting button 13, the adjustment spring 131 pushes the adjusting button 13 to reset, and drives the limit clamping strip 17 to reset, so that the limiting teeth 171 and the matching teeth 164 remesh, so as to fix the position of the clamping block 16.

Figure 14:
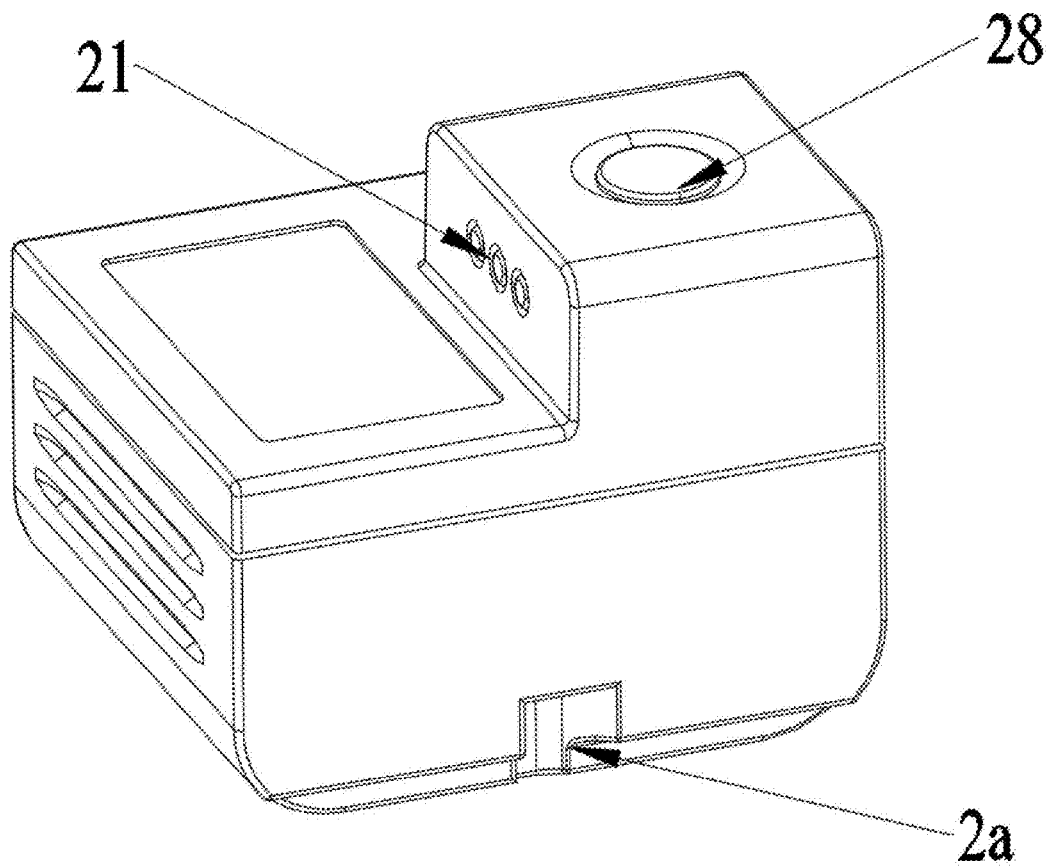
FIG. 14 is a perspective view of a battery.

Referring to FIGS. 4 and 14, when the battery buckle 151 is clamped and installed by the mounting base 11 and the rear cover 15, the battery buckle 151 is also supported by the buckle spring 152, so that part of the battery buckle spring 152 is exposed in the battery mounting groove of the mounting base 11 to clamp the buckling groove 2a on the installed battery 2, so that the battery 2 can be fixedly installed; and the upper part of the battery buckle 151 is exposed on the surface of the mounting base 11, so that the battery buckle 151 is pushed to move to the tail part of the down-hanging lamp main body, the battery buckle 151 can be disengaged from the engaging groove 2a, and the battery 2 can be disassembled.

Referring to FIGS. 4-7 and 22, the upper part of the clamping block 16 is provided with a bulge 161 corresponding to the width of the transverse groove of the Picatinny guide rail, to make it compatible with other non-standard guide rails with different transverse groove widths (the movable clamping block 12 itself is adjustable, so it has good compatibility with the width of the non-standard guide rail thereof, and more optimization considerations are not made), the bulge is provided with an expansion groove 166, and a compensation piece 163 can be fixedly installed by a compensation piece screw 163 to be embedded in the expansion groove 166, so as to widen the installation width, so that it can be compatible with other non-standard guide rails with different transverse groove widths; the bottom of the clamping block 16 is provided with a matching teeth 164 for meshing with the limiting teeth 171 on the limit clamping strip 17; in order to reduce the frictional contact area between the clamping block 16 and the limit clamping strip 17 and reduce frictional loss, a cushion block 165 is also fitted and installed at the bottom of the clamping block 16, and the cushion block 165 is lined between the clamping block 16 and the limit clamping strip 17 and protrudes from the bottom surface of the clamping block 16.

Referring to FIGS. 4 and 14, the elastic needle plate 18 is top pressed and fixed in the battery mounting groove 112 on the mounting base 11 by the elastic needle pressing plate 182, and a waterproof blocking pad 181 is also arranged between the elastic needle pressing plate 182 and the elastic needle plate 18; the battery 2 is provided with a conductive contact point 21; when the battery 2 is installed in the battery mounting groove 112 on the mounting base 11, the first elastic needle 183 is contacted with the contact point 21 so that the circuit is conducted, the battery 2 supplies power to the spotlight 19 on the down-hanging lamp main body 1.

Figure 15:
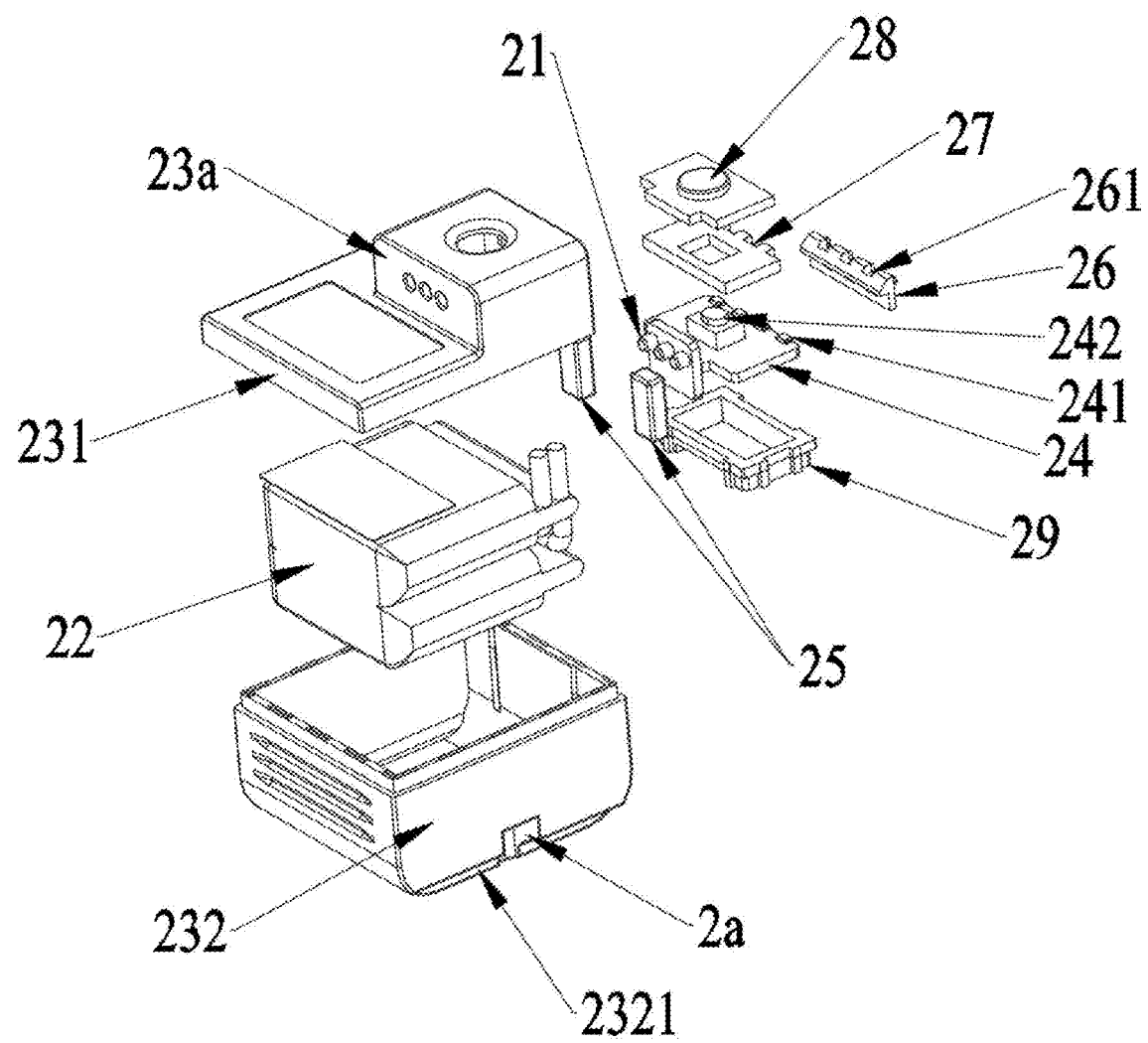
FIG. 15 is an exploded view of a battery.
Figure 16:
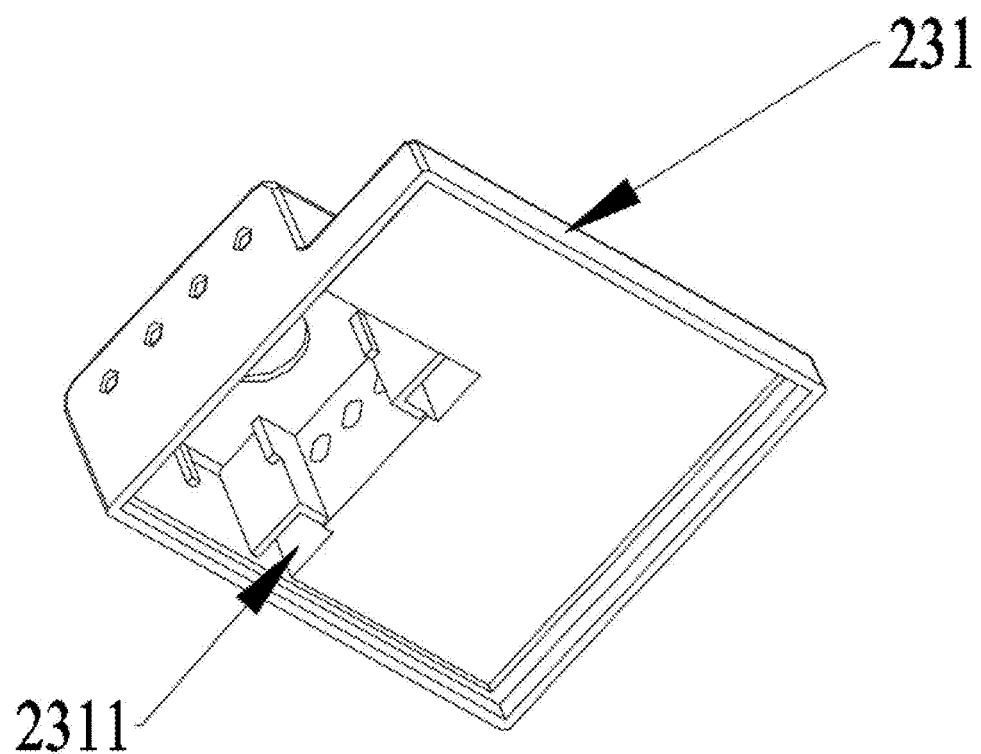
FIG. 16 is a structure schematic diagram of a battery pack upper housing.

As shown in FIGS. 14, 15 and 16, the battery 2 mainly comprises a battery core 22, a battery pack housing 23 and a control board 24, wherein the battery pack housing 23 comprises a battery pack upper housing 231 and a battery pack lower housing 232, the battery pack upper housing 231 is provided with a convex portion 23a, the battery mounting groove 112 is provided with a concave portion 1121, the concave portion 1121 is matched with the convex portion 23a, and the contact point 21 is positioned on the first surface of the convex portion 23a, the first elastic pin 183 is positioned on the inner wall of the concave portion 1121, the bottom of the battery pack lower housing 232 is provided with a buckling groove 2a, both sides of the bottom of the battery pack lower housing 232 are provided with brackets 2321, both sides of the bottom of the battery mounting groove 112 are provided with convex strips 1122; when the battery 2 is clamped into the battery mounting groove 112, the bracket 2321 will be clamped with the corresponding convex strip 1122 to limit the battery 2 in the battery mounting groove 112;

the battery core 22 is provided in the battery pack lower housing 232 and the battery pack upper housing 231; the control board 24 is positioned in the convex portion 23a; the control board 24 further comprises a vertical wiring board which is parallel to the first surface of the convex portion 23a, the control board 24 is provided with a plurality of contact points 21, the contact point 21 penetrate through the first surface of the convex portion 23a, and the contact point 21 and the battery core 22 are electrically connected with the control board 24;

two magnetic grooves 2311 are provided in the battery pack upper housing 231, the two magnetic grooves 2311 are positioned in the convex portion 23a and are distributed on both sides of all contact point 21, each magnetic groove 2311 is provided with a first magnet 25, the magnetic pole directions of the two first magnets 23 are opposite, the magnetic charging cable 4 is provided with two second magnets 42 and is positioned on both sides of all second elastic needles 41, the magnetic pole directions of the two second magnets 42 are opposite, and the first magnet 25 attract the corresponding second magnet 42; when all the first magnets 25 attract all the second magnets 42, the second elastic needle 41 contact and communicate with the contact point 21 one by one.

The battery 2 further comprises a light guide member 26, the control board is provided with a plurality of indicator lamps 241, the light incident surface of the light guide member 26 is matched with all the indicator lamps 241, and the light emitting surface of the light guide member 26 penetrates through the second surface of the convex portion 23a, the light guide member 26 is provided with a plurality of grooves 261, the groove 261 is used for dividing the light emitting surface, so that light emitted by the indicator lamp 241 can be emitted from different emergent surfaces, the convex portion 23a is provided with a light shielding cotton 27, and the light shielding cotton 27 is provided in the groove 261, and the light shielding cotton 27 is used for preventing light rays in the light guide member 26 from interfering with each other.

The control board 24 is provided with a detection switch 242, the battery pack housing 23 is provided with a detection button 28 matched with the detection switch 242, pressing the detection button 28 will trigger the detection switch 242, and when the detection switch 242 is triggered, a battery detection process will be triggered, wherein the battery testing process comprises the following steps:

S11, detecting whether the battery 2 is in a standby state, and if so, performing S2;

S12, detecting whether the battery 2 is not in the electric quantity indication state, and if not, performing S3;

S13, detecting whether the battery 2 is not in a charging state, and if not, performing S4;

S14, detecting the capacity of the battery 2, displaying a corresponding number of indicator lamp 241 according to the battery capacity, and turning them off after 3 seconds of display (the display time can be adjusted according to needs).

Figure 17:
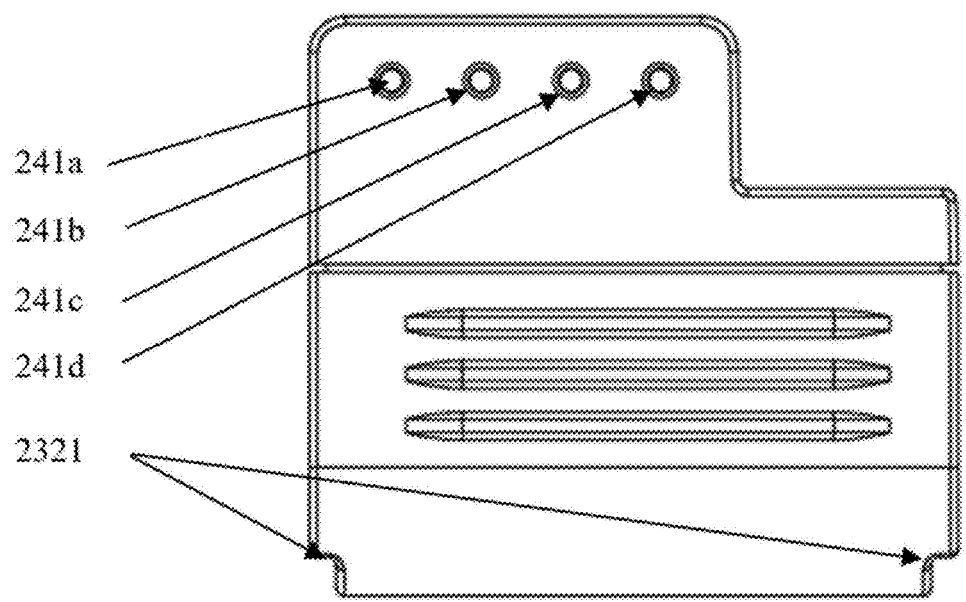
FIG. 17 is a rear view of a battery.
Figure 18:
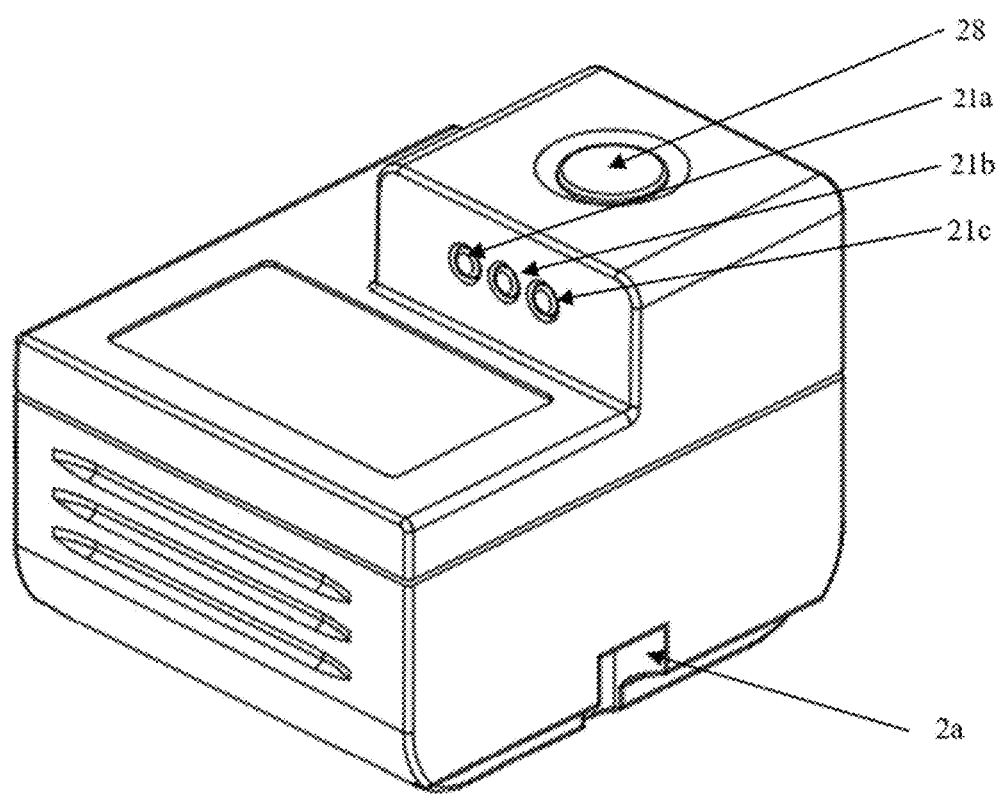
FIG. 18 is a perspective view II of a battery.
Figure 20:
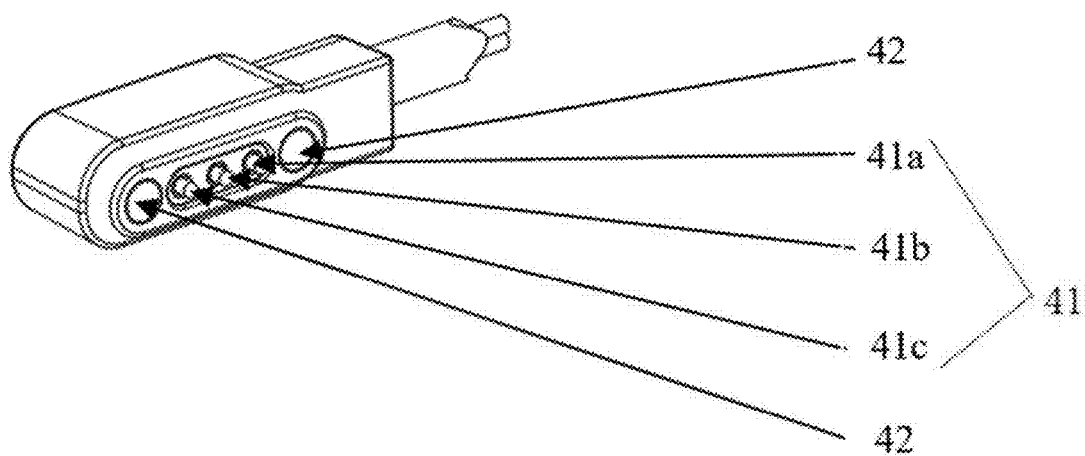
FIG. 20 is a structure schematic diagram of a magnetic charging cable.
Figure 21:
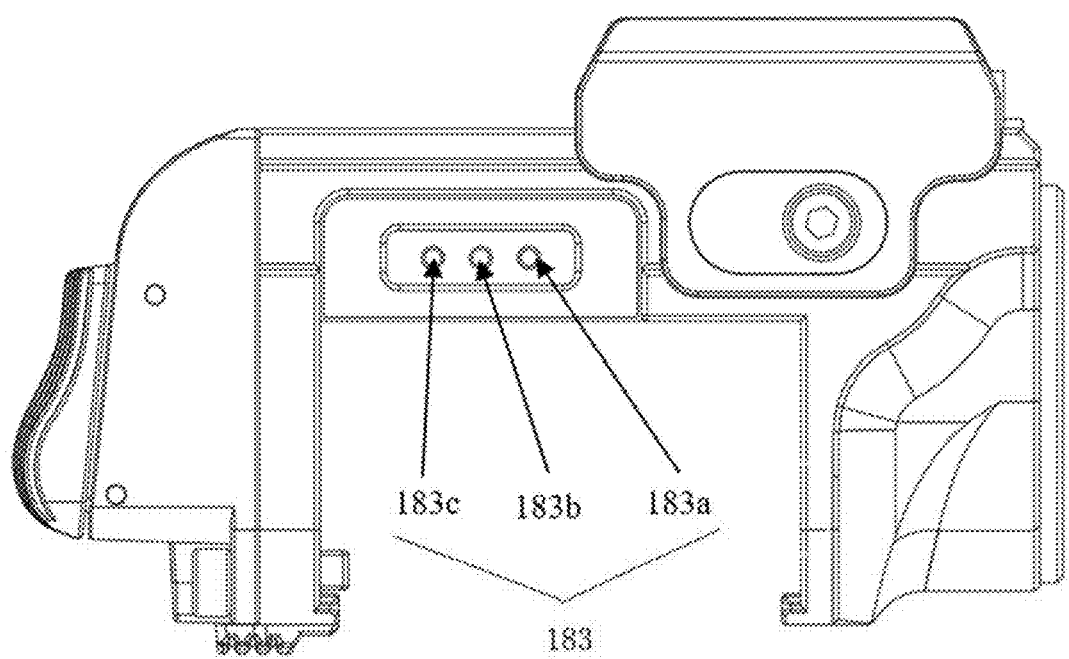
FIG. 21 is a rear view of a down-hanging lamp main body.
Figure 22:
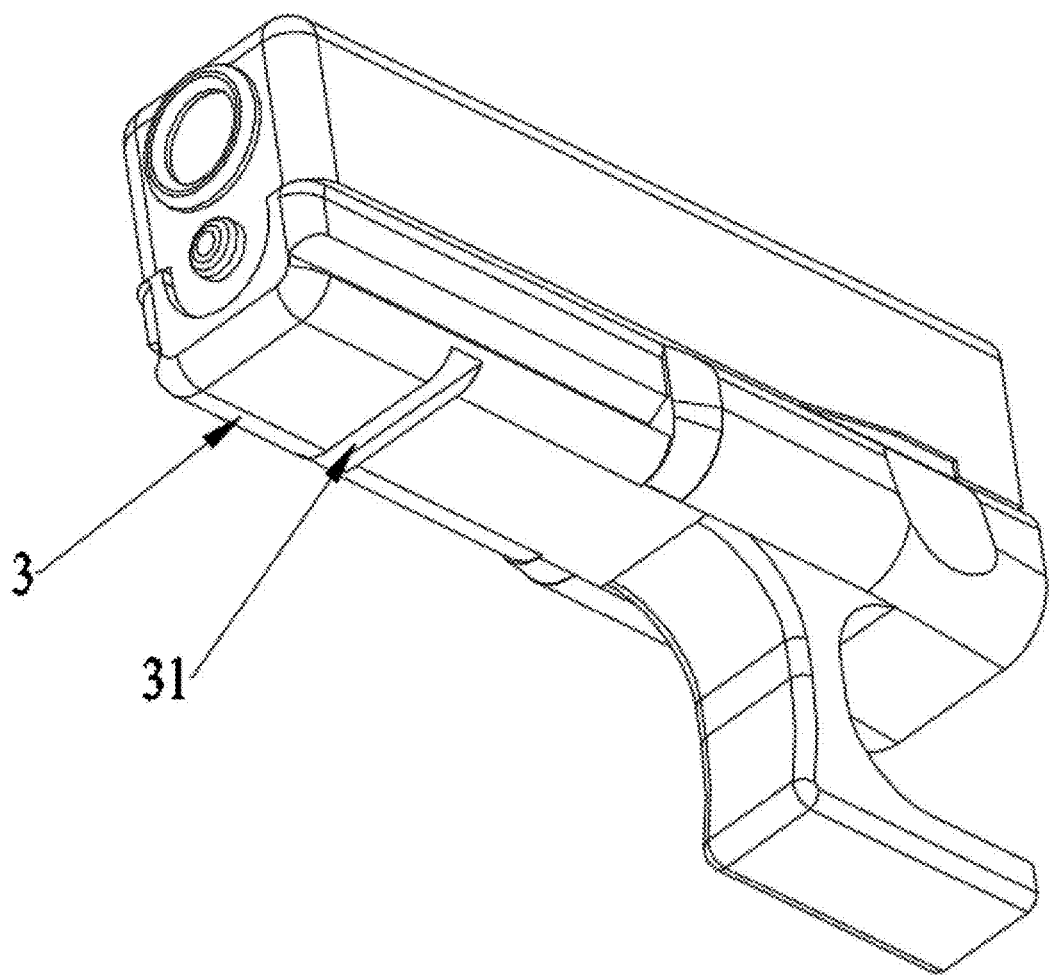
FIG. 22 is a structure schematic diagram of a guide rail on the firearm.
Figure 23:
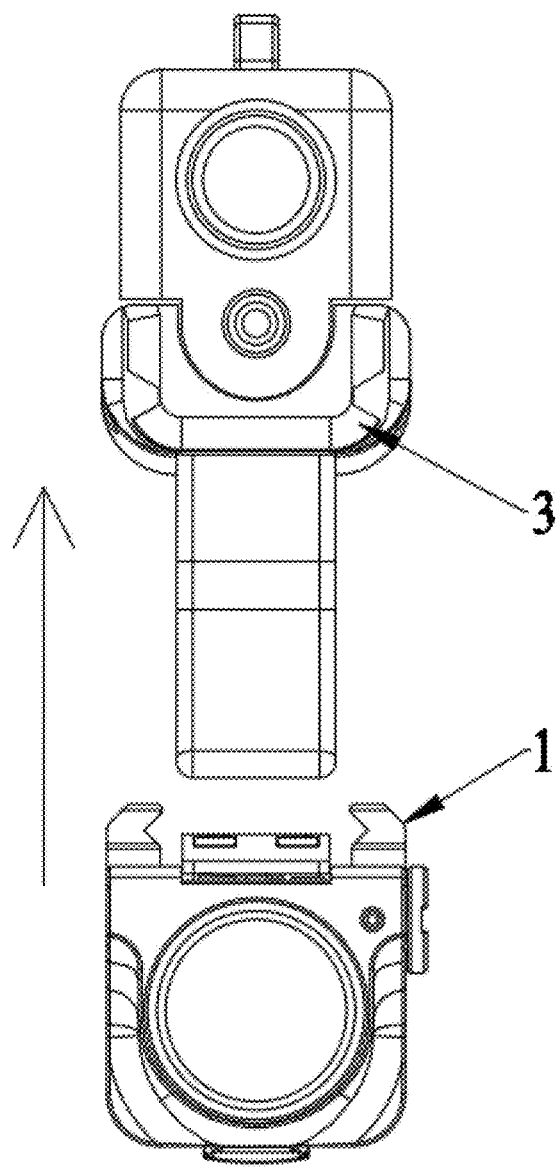
FIG. 23 is a schematic diagram of assembly of a down-hanging lamp main body and a guide rail (left view)
Figure 24:
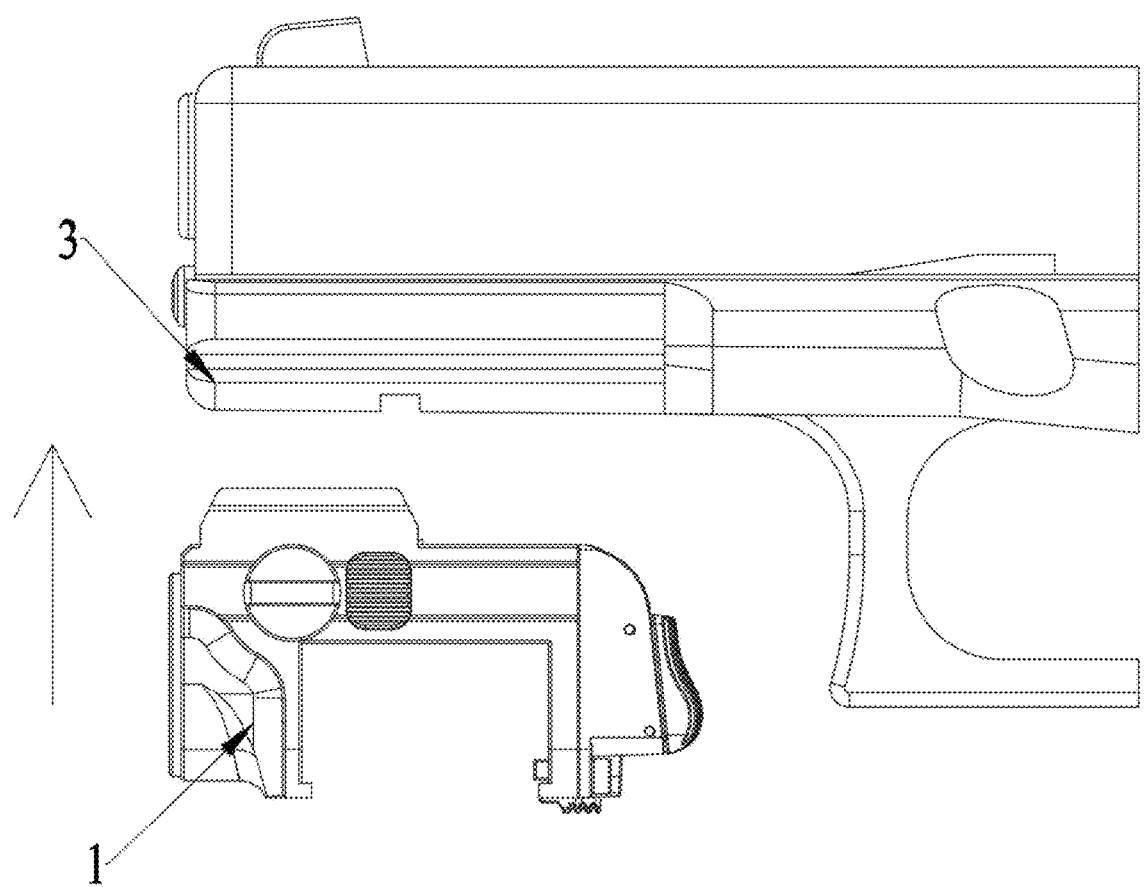
FIG. 24 is a schematic diagram of assembly of the down-hanging lamp main body and the guide rail (front view).

As shown in FIG. 17, 241a is a power shortage indicator lamp, and 241b, 241c and 241d are power indicator lamps;

as shown in FIG. 18, 21a is a battery positive contact, i.e. a battery positive output pin; 21b is a battery negative contact, i.e. a battery negative output pin; 21c is a battery signal contact, which is used for low charge signal input when power is supplied to the down-hanging lamp main body 1; and when charging the battery 2 through magnetic charging cable 4, the battery signal contact 21c is the positive input pin;

as shown in FIG. 20, 41a is a charging cable empty elastic needle (suspended); 41b is a charging cable negative elastic needle, i.e. a USB negative output pin; and 41c is a charging cable positive elastic needle, i.e. a USB positive output pin;

as shown in FIG. 21, 183a is a gun lamp signal elastic needle; when the down-hanging lamp main body 1 works, the input voltage of the battery 2 is detected through the chip inside the down-hanging lamp main body 1, and when the voltage decreases, the signal of this pin changes from low to high; 183b is a gun lamp positive elastic needle, i.e., a battery negative input pin; and 183c is a gun lamp negative elastic needle, i.e., a battery positive input pin.

After the battery 2 is installed in the down-hanging lamp main body 1, a power-on button on the down-hanging lamp main body 1 is triggered, and then a down-hanging lamp main body detection process is triggered, wherein the main body detection process comprises the following steps:

S21, detecting whether the electric quantity of the battery 2 is low, and if so, performing step S22, otherwise, performing step S23;

S22, the gun lamp signal elastic needle 83a outputs a high level electric signal, and performing step S23;

S23, detecting whether the input of the battery signal contact 21c is high and less than 4.25V, and if so, performing step S24;

S24, determining that the battery 2 is connected to the down-hanging lamp main body 1 and is a low battery input signal, and performing step S25;

S25, when the battery 2 flashes an indicator lamp 241 (i.e., a power-shortage indicator lamp 241a), it reminds to replace the battery 2.

Figure 19:
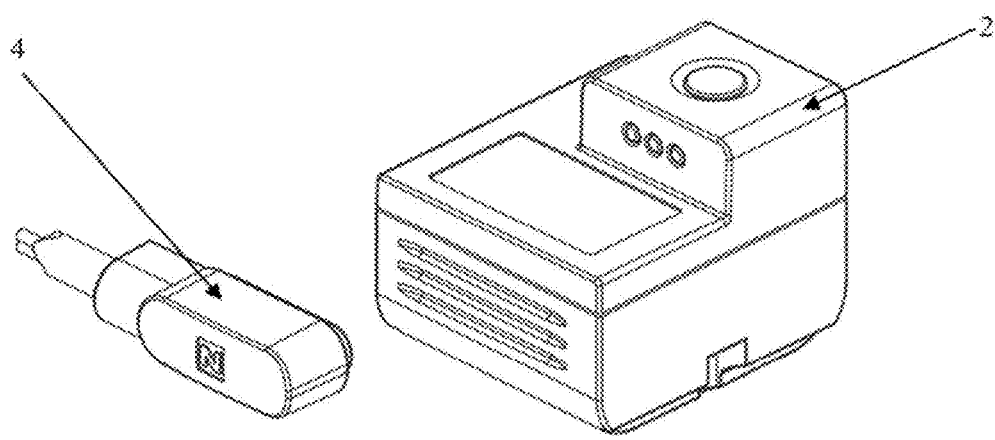
FIG. 19 is a structure schematic diagram of a battery and a magnetic charging cable.

As shown in FIGS. 19 and 20, the device further comprises a magnetic charging cable 4 used for charging the battery 2, wherein the magnetic charging cable 4 is provided with a second elastic needle 41 matched with the contact point 21, and the magnetic charging cable 4 is connected with the battery 2 through magnetic attraction; when the battery 2 is detached from the down-hanging lamp main body 1, the battery 2 is connected with the magnetic charging cable 4, and a charging detection process is triggered, wherein the charging detection process comprises the following steps:

S31, detecting a charging signal;

S32, judging whether the charging signal is correct, and if so, performing step S33, otherwise, performing step S31;

S33, reading a voltage signal of the charging port, and performing step S34; when the signal is lost, performing step S31;

S34, judging whether the input voltage is greater than 4.25V, and if so, performing step S35, otherwise, performing step S31;

S35, determining that the charging cable is connected, starting the flow lamp self-test, and performing step S36;

S36, detecting the charging capacity, performing step S37, and performing step S31 when the signal is lost;

S37, the indicator lamp flashes, and whether the signal is full or not is judged; if the signal is full, performing step S38, and performing step S31 when the signal is lost;

S38, all indicators are always on.

When the battery 2 has no power or is short of power, the power-short indicator lamp 241a is turned on, and at this time, the battery 2 can be removed from the down-hanging lamp main body 1 by pushing the battery buckle 151 to the bottom of the rear of the down-hanging lamp main body 1 (the rear of the down-hanging lamp main body 1 is the right side in FIG. 10) and pushing the battery 2 to the right (the left side in FIG. 9) to remove the battery 2 from the down-hanging lamp main body 1. The battery 2 is charged separately using the magnetic charging cable 4.

When the battery 2 is charged through the magnetic charging cable 4, the magnetic pole directions of the two first magnets 25 are opposite, the magnetic poles of the corresponding two second magnets 42 are also opposite, meanwhile the first magnet 25 and the corresponding second magnet 42 are attracted to each other; therefore, when the battery 2 is charged, the magnetic charging cable 4 can automatically align with the first surface of the convex portion 23a; after the magnetic charging cable 4 is attracted to the battery 2, the battery positive contact 21a contacts and communicates with the charging cable empty needle 41a, the battery negative contact 21b contacts and communicates with the charging cable negative elastic needle 41b, and the battery signal contact 21c contacts and communicates with the charging cable positive elastic needle 41c to charge the battery 2.

When the indicator lamp 241a, 241b, 241c and 241d are all on for a long time, indicating that the battery 2 is charged completely, aligning the battery 2 with the battery mounting groove 112, aligning the contact point 21 with the first elastic needle 182, pushing the battery 2 into the battery mounting groove 112, clamping the convex strip 1122 into the corresponding bracket 2321, supporting the bracket 2321 through the convex strip 1122; during the process of pushing the battery 2 into the battery mounting groove 112, the battery pack housing 23 pushes the battery buckle 151 to move toward the rear of the down-hanging lamp main body 1 and compresses the buckle spring 152; when the battery 2 is completely inserted into the battery mounting groove 112, the buckle spring 152 pushes the battery buckle 151 move toward the head of the down-hanging lamp main body 1 (in FIG. 10, the head of the down-hanging lamp main body 1 is on the left side), the battery buckle 151 is locked into the buckling groove 2a, the battery 2 is restricted from being separated from the battery mounting groove 112, and at the same time, the battery signal contact 21c contacts and communicates with the gun lamp signal elastic needle 183a, the battery positive contact 21a contacts and communicates with the gun lamp positive elastic needle 183b, the battery negative contact 21b contacts and communicates with the gun lamp negative elastic needle 183c, and the battery 2 provides stable power supply to the down-hanging lamp main body 1.

The above is an example of the best embodiment of the present disclosure, wherein the parts not described in detail are common knowledge of a person skilled in the art. The scope of protection of the present disclosure is subject to the contents of the claims, and any equivalent transformation based on the technical inspiration of the present disclosure is also within the scope of protection of the present disclosure.

What is claimed is:

1. A down-hanging lamp used for mounting on a guide rail of a firearm, wherein the guide rail is provided with a transverse groove, wherein a down-hanging lamp comprises a main body, the main body comprising: a mounting base, a movable clamping block and a clamping block;
    a front of the mounting base is provided with a spotlight;
    one side of an upper part of the mounting base is provided with a fixed clamping block formed by extending upwards, an opposite side of the mounting base is detachably provided with the movable clamping block, and the fixed clamping block and the movable clamping block are used for being oppositely clamped on both sides of the guide rail;
    an upper part of the mounting base is provided with a limit clamping strip arranged along a direction of the guide rail in an embedded manner;
    the clamping block is provided at the upper part of the mounting base and only has a freedom of sliding along the direction of the guide rail; an upper part of the clamping block is provided with a bulge which is used for being embedded with the transverse groove, and a lower part of the clamping block is engaged with the limit clamping strip;
    one side of the mounting base is inserted and provided with an adjusting button which is used for controlling the limit clamping strip to engage or disengage with the clamping block;
    the down-hanging lamp further comprises a battery;
    a battery mounting groove is formed on the mounting base;
    the battery is detachably installed in the battery mounting groove and is electrically connected with the mounting base;
    the mounting base is provided with a battery buckle, an upper part of the battery buckle is exposed to a surface of the mounting base, and a lower part of the battery buckle protrudes from a surface of the battery mounting groove;
    the mounting base is internally provided with a buckle spring, and the buckle spring pushes the battery buckle towards the direction that the battery buckle protrudes from the surface of the battery mounting groove;
    a surface of the battery is provided with a buckling groove, and when the battery is installed in the battery mounting groove, the lower part of the battery buckle is embedded with the buckling groove;
    the surface of the battery is provided with a conductive contact point, the battery mounting groove is internally provided with an elastic needle plate, the elastic needle plate is top pressed and fixed in the battery mounting groove through an elastic needle pressing plate, and a blocking pad with waterproof performance is lined between the elastic needle pressing plate and the elastic needle plate;
    when the battery is installed in the battery mounting groove, a first elastic needle on the elastic needle plate is kept in contact with the contact point;
    one side of the mounting base is inserted and provided with a fastening shaft, an end part of an insertion end of the fastening shaft is provided with an axial threaded hole, and the insertion end of the fastening shaft is clamped with a first washer for limiting the fastening shaft pulling out;
    one side of the movable clamping block facing away from the mounting base is embedded and provided with an anti-drop bolt, and the anti-drop bolt is used for threaded connection of the fastening shaft;
    one side of the movable clamping block facing away from the mounting base is embedded and provided with a locking element, one side of the locking element facing away from the mounting base is embedded and provided with the anti-drop bolt, and an anti-drop spring is lined between the locking element and the movable clamping block;
    a position of the fastening shaft close to an outer end part is provided with a ring of tooth grooves, a front end opening of the mounting base is provided with an elastic thimble, and a mounting direction of the elastic thimble is orthogonal to the mounting direction of the fastening shaft;
    a tip of the elastic thimble is pushed inwards into the tooth groove of the fastening shaft;
    the elastic thimble is provided with threads, and the distance between an outer end surface of the elastic thimble and the fastening shaft is adjustable;
    an end part of an insertion end of the adjusting button is clamped with a second washer for limiting the adjusting button pulling out;
    an adjusting spring is lined between the adjusting button and the mounting base;
    the limit clamping strip is provided with an adjusting groove, and the end part of the insertion end of the adjusting button hooks the adjusting groove;
    the limit clamping strip is provided with a row of limiting teeth arranged along the direction of the guide rail, a bottom of the clamping block is provided with a matching teeth, and the matching teeth is meshed with the limiting teeth;
    a cushion block is lined between the clamping block and the limit clamping strip;
    the bulge of the clamping block is provided with an expansion groove, the expansion groove is used for fitting and installing a compensation piece, and the compensation piece is fitted with the bulge and used for embedding the transverse groove with different widths; and
    further comprising a magnetic charging cable used for charging the battery, wherein the magnetic charging cable is provided with a second elastic needle matched with the contact point, and the magnetic charging cable is connected with the battery through magnetic attraction.

2. The down-hanging lamp according to claim 1, wherein the battery comprises a battery core, a battery pack housing and a control board, wherein the battery core is provided in the battery pack housing, the battery pack housing is provided with a convex portion, the battery mounting groove is provided with a concave portion, the concave portion is matched with the convex portion;

the control board is positioned in the convex portion, the control board is provided with a plurality of contact points, the contact point penetrates through the surface of the convex portion, the convex portion is provided with two first magnets, magnetic pole directions of the two first magnets are opposite, and the contact point and the battery core are electrically connected with the control board; and the magnetic charging cable is provided with two second magnets, the magnetic pole directions of the two second magnets are opposite, and after all the first magnets and all the second magnets attract each other, the second elastic needle is communicated with the contact point.

3. The down-hanging lamp according to claim 2, wherein the battery pack housing comprises a battery pack upper housing and a battery pack lower housing, the convex portion is provided on the battery pack upper housing, and the buckling groove is provided on the battery pack lower housing.

4. The down-hanging lamp according to claim 3, wherein both sides of a bottom of the battery pack lower housing are provided with brackets, both sides of the bottom of the battery mounting groove are provided with convex strips, and the convex strip is matched with the bracket.

5. The down-hanging lamp according to claim 3, wherein the battery pack upper housing is provided with a plurality of magnetic grooves, the magnetic groove is positioned inside the convex portion, and the first magnet is provided in the magnetic groove.

6. The down-hanging lamp according to claim 2, wherein the battery further comprises a light guide member, the control board is provided with a plurality of indicator lamps, a light incident surface of the light guide member is matched with all the indicator lamps, and the light emitting surface of the light guide member penetrates through a surface of the convex portion.

7. The down-hanging lamp according to claim 2, wherein the light guide member is provided with a plurality of grooves, the groove is used for dividing the light emitting surface, the convex portion is provided with a light shielding cotton, and the light shielding cotton is provided in the groove.

8. The down-hanging lamp according to claim 6, wherein the control board is provided with a detection switch, and the battery pack housing is provided with a detection button matched with the detection switch.

9. The down-hanging lamp according to claim 2, wherein a bracket is provided between the battery cell and the control board.

* * * * *